US012758824B2

(12) United States Patent
Lee et al.

(10) Patent No.: US 12,758,824 B2
(45) Date of Patent: Oct. 13, 2026

(54) METHOD OF PROVIDING CUSTOMIZED TRAINING CONTENT AND USER TERMINAL FOR IMPLEMENTING THE SAME

(71) Applicant: LG ELECTRONICS INC., Seoul (KR)

(72) Inventors: Haein Lee, Seoul (KR); Hyongguk Kim, Seoul (KR); Bomyeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1000 days.

(21) Appl. No.: 17/814,419

(22) Filed: Jul. 22, 2022

(65) Prior Publication Data

US 2023/0233906 A1 Jul. 27, 2023

(30) Foreign Application Priority Data

Jan. 25, 2022 (KR) ........................ 10-2022-0010488

(51) Int. Cl.
*A63B 24/00* (2006.01)
*A63B 71/06* (2006.01)
(Continued)

(52) U.S. Cl.
CPC ...... *A63B 24/0075* (2013.01); *A63B 71/0622* (2013.01); *G06T 11/00* (2013.01);
(Continued)

(58) Field of Classification Search
CPC ............ A63B 24/0075; A63B 71/0622; A63B 2024/0068; A63B 2220/807;
(Continued)

(56) References Cited

U.S. PATENT DOCUMENTS 11,861,944 B1 * 1/2024 Yerushalmy ........... G06V 20/44
2014/0287389 A1 9/2014 Kallmann et al.
(Continued)

FOREIGN PATENT DOCUMENTS

JP 2020-150987 9/2020
KR 10-1399655 5/2014
(Continued)

OTHER PUBLICATIONS

European Patent Office Application Serial No. 22184587.8, Search Report dated Dec. 19, 2022, 9 pages.

*Primary Examiner* — Peter S Vasat
*Assistant Examiner* — Stephen Alvesteffer
(74) *Attorney, Agent, or Firm* — LEE, HONG, DEGERMAN, KANG & WAIMEY

(57) ABSTRACT

The present disclosure provides a method of providing customized training content and a user terminal for implementing the same for further increasing interest in exercise by providing training content in consideration of the physical ability and characteristics of a user and simultaneously allowing the user to easily know whether the user is exercising with a correct posture and method to continuously exercise at a pace suitable for a level of the user. The user terminal includes a display, a camera, and a controller configured to perform control to acquire information on a reference posture of a trainer appearing in an exercise content through artificial intelligence, to recognize an exercise posture of a user photographed through the camera through artificial intelligence while the exercise content is reproduced, and to adjust a reproduction speed of the exercise content based on the recognized exercise posture of the user.

18 Claims, 16 Drawing Sheets

(51) Int. Cl.

| | |
|---|---|
| ***G06T 11/00*** | (2006.01) |
| ***G06V 10/74*** | (2022.01) |
| ***G06V 40/10*** | (2022.01) |
| ***G06V 40/20*** | (2022.01) |

(52) U.S. Cl.

CPC ............ *G06V 10/74* (2022.01); *G06V 40/103* (2022.01); *G06V 40/23* (2022.01); *A63B 2024/0068* (2013.01); *A63B 2220/807* (2013.01); *A63B 2230/625* (2013.01)

(58) Field of Classification Search

CPC .......... A63B 2230/625; A63B 24/0006; A63B 2024/0012; G06T 11/00; G06T 7/20; G06V 10/74; G06V 40/103; G06V 40/23; G16H 30/40; G16H 50/20; G16H 20/30; G06Q 50/10; H04N 21/44218; H04N 21/47217

USPC .......................................................... 434/247

See application file for complete search history.

(56) References Cited

U.S. PATENT DOCUMENTS

| | | | | |
|---|---|---|---|---|
| 2017/0177084 | A1* | 6/2017 | Mangharam ....... | A63B 21/4037 |
| 2018/0268865 | A1* | 9/2018 | Ekambaram ......... | G11B 27/005 |
| 2020/0306589 | A1* | 10/2020 | Jabr .................. | A63B 24/0062 |
| 2021/0008413 | A1* | 1/2021 | Asikainen ............. | G06F 3/0304 |

FOREIGN PATENT DOCUMENTS

| | | | | |
|---|---|---|---|---|
| KR | 1020150128077 | | 11/2015 | |
| KR | 10-2016-0025229 | | 3/2016 | |
| KR | 1020190044952 | | 5/2019 | |
| KR | 10-2000763 | | 7/2019 | |
| KR | 10-2123869 | | 6/2020 | |
| KR | 10-2020-0129327 | | 11/2020 | |
| KR | 10-2020-0133847 | | 12/2020 | |
| KR | 10-2021-0008104 | | 1/2021 | |
| KR | 10-2021-0054089 | | 5/2021 | |
| KR | 102304641 | | 9/2021 | |
| KR | 102304641 | B1 * | 9/2021 | ........... A63B 69/004 |

* cited by examiner (6-1) (6-2)

METHOD OF PROVIDING CUSTOMIZED TRAINING CONTENT AND USER TERMINAL FOR IMPLEMENTING THE SAME

CROSS-REFERENCE TO RELATED APPLICATION(S)

Pursuant to 35 U.S.C. § 119(a), this application claims the benefit of earlier filing date and right of priority to Korean Patent Application No. 10-2022-0010488, filed on Jan. 25, 2022, the contents of which is hereby incorporated by reference herein in its entirety.

BACKGROUND OF THE PRESENT DISCLOSURE

Field of the Present Disclosure

The present disclosure relates to a method of providing customized training content and a user terminal for implementing the same.

Discussion of the Related Art

User terminals may be generally classified as mobile/portable terminals or stationary terminals according to their mobility. User terminals may also be classified as handheld terminals or vehicle mounted terminals according to whether or not a user can directly carry the terminal.

User terminals have become increasingly more functional. Examples of such functions include data and voice communications, capturing images and video via a camera, recording audio, playing music files via a speaker system, and displaying images and video on a display. Some user terminals include additional functionality which supports game playing, while other terminals are configured as multimedia players. More recently, user terminals have been configured to receive broadcast and multicast signals which permit viewing of content such as videos and television programs.

User terminals may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, user terminals have been configured to receive broadcast and multicast signals which permit viewing of contents, such as videos and television programs.

Efforts are ongoing to support and increase the functionality of user terminals. Such efforts include software and hardware improvements, as well as changes and improvements in the structural components.

Recently, as interest in health has increased, many people have recognized need for exercise for health promotion, and have been actually managed their health through various exercises. According to this trend, research and development for mobile health care systems have also been actively carried out.

For example, an online training service has been released to allow a user to receive online exercise training content for allowing the user to do an exercise suitable for him or her without aid of a trainer through a user terminal and to exercise while watching the exercise training content.

However, such an online training service provides exercise program content that is unilaterally prepared without considering the user's physical ability and characteristics even though each user has different physical abilities and characteristics. For this reason, frequently, the user easily loses interest in exercise because it is difficult for the user to follow or the user is provided with an exercise program that is too easy to follow.

It is very difficult for the user to know whether he or she is exercising with a correct posture and method by following while watching the exercise program content reproduced through the user terminal, rather, injuries caused by a wrong posture and/or excessive exercise may actually have a negative impact on the health.

SUMMARY OF THE PRESENT DISCLOSURE

An object of embodiment(s) is to provide a method of providing customized training content and a user terminal for implementing the same for further increasing interest in exercise by providing training content in consideration of the physical ability and characteristics of a user and simultaneously allowing the user to easily know whether the user is exercising with a correct posture and method to continuously exercise at a pace suitable for a level of the user.

To achieve these objects and other advantages and in accordance with the purpose of the present disclosure, as embodied and broadly described herein, a user terminal includes a display, a camera, and a controller configured to perform control to acquire information on a reference posture of a trainer appearing in an exercise content through artificial intelligence, to recognize an exercise posture of a user photographed through the camera through artificial intelligence while the exercise content is reproduced, and to adjust a reproduction speed of the exercise content based on the recognized exercise posture of the user.

The controller may acquire the information on the reference posture while the exercise content is reproduced.

The controller may compare the reference posture and the exercise posture of the user to recognize exercise performance of the user, and may perform control to adjust the reproduction speed of the exercise content according to the recognized exercise performance.

The exercise performance may be determined according to synchronization between a real-time exercise posture of the user and a real-time reference posture while the exercise content is reproduced.

In response to the real-time exercise posture of the user being later than the real-time reference posture, the controller may perform control to pause reproduction of the exercise content or lower the reproduction speed of the exercise content until the real-time reference posture and the real-time exercise posture of the user are synchronized with each other.

In response to the real-time exercise posture of the user being faster than the real-time reference posture, the controller may perform control to increase the reproduction speed of the exercise content until the real-time reference posture and the real-time exercise posture of the user are synchronized with each other.

The exercise performance may be determined according to accuracy of a real-time exercise posture of the user based on a real-time reference posture while the exercise content is reproduced.

In response to the accuracy being equal to or less than a predetermined level, the controller may perform control to lower the reproduction speed of the exercise content.

The controller may perform control to display the recognized exercise posture of the user on the display, to generate a reference posture guide from the information on the reference posture, and to display the reference posture guide to be overlaid on the exercise posture of the user.

The controller may perform control to correct a shape of the reference posture guide to match body characteristics of the user.

The controller may perform control to compare the reference posture and the exercise posture of the user to recognize exercise performance of the user, and to change a reproduction speed of the exercise content according to the recognized exercise performance.

The controller may perform control to change a display image of the reproduced exercise content according to the recognized exercise posture of the user.

The controller may perform control to change a direction of the trainer of the reproduced exercise content to match a direction of the recognized exercise posture of the user.

In response to a change in the recognized exercise posture of the user matching a preset gesture, the controller may perform control to move the trainer in the exercise content or enlarge or reduce the trainer in the exercise content.

The controller may perform control to enlarge or reduce a trainer in the exercise content according to a separation distance between the recognized user and the display.

In an aspect of the present disclosure, a method of controlling a user terminal includes acquiring information on a reference posture of a trainer appearing in an exercise content through artificial intelligence, recognizing an exercise posture of a user photographed through the camera through artificial intelligence while the exercise content is reproduced on a display, and adjusting a reproduction speed of the exercise content based on the recognized exercise posture of the user.

DETAILED DESCRIPTION OF THE PRESENT DISCLOSURE

Figure 1:
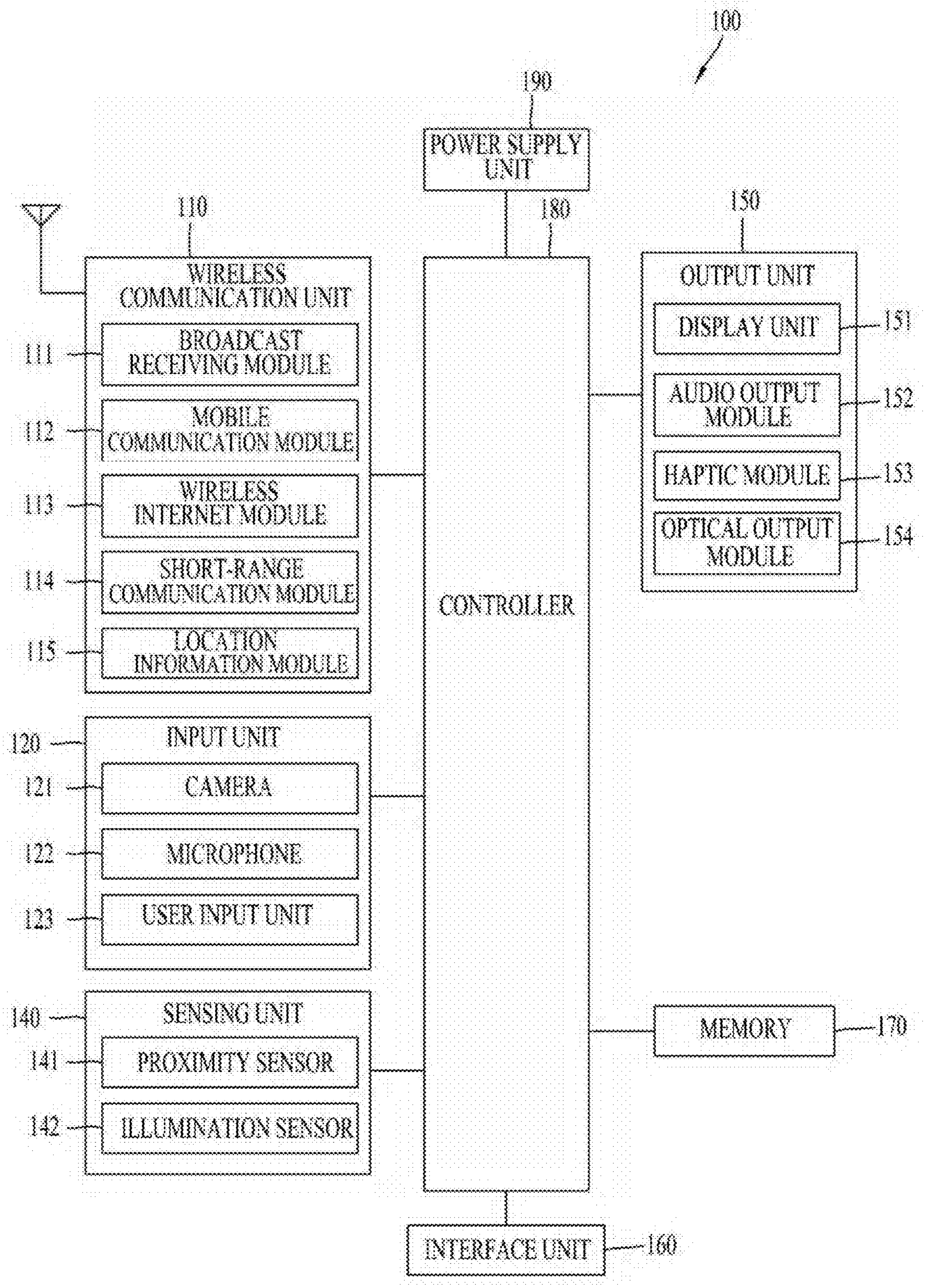
FIG. 1 is a schematic block diagram of a user terminal in terms of hardware according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

In this disclosure, the expression "at least one of A or B" may mean "A", "B", or "A and B".

User terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of user terminals. However, such teachings apply equally to other types of terminals, such as those types noted above. In addition, these teachings may also be applied to stationary terminals such as digital TV, desktop computers, and the like.

Reference is now made to FIG. 1, which is a block diagram of a user terminal in accordance with the present disclosure.

The user terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the user terminal 100 is shown having wireless communication unit 110 configured with several commonly implemented components. For instance, the wireless communication unit 110 typically includes one or more components which permit wireless communication between the user terminal 100 and a wireless communication system or network within which the user terminal is located.

The wireless communication unit 110 typically includes one or more modules which permit communications such as wireless communications between the user terminal 100 and a wireless communication system, communications between the user terminal 100 and another user terminal, communications between the user terminal 100 and an external server. Further, the wireless communication unit 110 typically includes one or more modules which connect the user terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the user terminal, the surrounding environment of the user terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The user terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the user terminal 100 and a user, as well as function as the user input unit 123 which provides an input interface between the user terminal 100 and the user.

The interface unit 160 serves as an interface with various types of external devices that can be coupled to the user terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the user terminal 100 may perform assorted control functions associated with a connected external device, in response to the external device being connected to the interface unit 160.

The memory 170 is typically implemented to store data to support various functions or features of the user terminal 100. For instance, the memory 170 may be configured to store application programs executed in the user terminal 100, data or instructions for operations of the user terminal 100, and the like. Some of these application programs may be downloaded from an external server via wireless communication. Other application programs may be installed within the user terminal 100 at time of manufacturing or shipping, which is typically the case for basic functions of the user terminal 100 (for example, receiving a call, placing a call, receiving a message, sending a message, and the like). It is common for application programs to be stored in the memory 170, installed in the user terminal 100, and executed by the controller 180 to perform an operation (or function) for the user terminal 100.

The controller 180 typically functions to control overall operation of the user terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the user terminal 100. The power supply unit 190 may include a battery, and the battery may be configured to be embedded in the terminal body, or configured to be detachable from the terminal body.

At least some of the components may operate in cooperation with each other to implement an operation, control, or a control method of the user terminal according to various embodiments to be described below. In addition, the operation, the control, or the control method of the user terminal may be implemented on the user terminal by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the user terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external user terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), 5G, and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the user terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A, 5G and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the user terminal 100 and a wireless communication system, communications between the user terminal 100 and another user terminal 100, or communications between the user terminal and a network where another user terminal 100 (or an external server) is located, via wireless area networks. One example of the wireless area networks is a wireless personal area networks.

In some embodiments, another user terminal (which may be configured similarly to user terminal 100) may be a wearable device, for example, a smart watch, a smart glass or a head mounted display (HMD), which is able to exchange data with the user terminal 100 (or otherwise cooperate with the user terminal 100). The short-range communication module 114 may sense or recognize the wearable device, and permit communication between the wearable device and the user terminal 100. In addition, when the sensed wearable device is a device which is authenticated to communicate with the user terminal 100, the controller 180, for example, may cause transmission of data processed in the user terminal 100 to the wearable device via the short-range communication module 114. Hence, a user of the wearable device may use the data processed in the user terminal 100 on the wearable device. For example, when a call is received in the user terminal 100, the user may answer the call using the wearable device. Also, when a message is received in the user terminal 100, the user can check the received message using the wearable device.

The location information module 115 is generally configured to detect, calculate, derive or otherwise identify a position of the user terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the user terminal. As one example, when the user terminal uses a GPS module, a position of the user terminal may be acquired using a signal sent from a GPS satellite. As another example, when the user terminal uses the Wi-Fi module, a position of the user terminal can be acquired based on information related to a wireless access point (AP) which transmits or receives a wireless signal to or from the Wi-Fi module.

The input unit 120 may be configured to permit various types of input to the user terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the user terminal 100. As another example, the cameras 121 may be located in a stereoscopic arrangement to acquire left and right images for implementing a stereoscopic image. The plurality of cameras 121 may include a depth camera and/or a time of flight (TOF) camera for three-dimensionally sensing a subject.

The microphone 122 is generally implemented to permit audio input to the user terminal 100. The audio input can be processed in various manners according to a function being executed in the user terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the user terminal 100. The user input unit 123 may include one or more of a mechanical input element (for example, a key, a button located on a front and/or rear surface or a side surface of the user terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the user terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the user terminal, surrounding environment information of the user terminal, user information, or the like. The controller 180 generally cooperates with the sending unit 140 to control operation of the user terminal 100 or execute data processing, a function or an operation associated with an application program installed in the user terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the user terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the user terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the user terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the user terminal 100. For example, the display unit 151 may display execution screen information of an application program executing at the user terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the user terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the user terminal 100.

An optical output module 154 can output a signal for indicating an event generation using light of a light source. Examples of events generated in the user terminal 100 may include message reception, call signal reception, a missed call, an alarm, a schedule notice, an email reception, information reception through an application, and the like.

A signal output by the optical output module 154 may be implemented in such a manner that the user terminal emits monochromatic light or light with a plurality of colors. The signal output may be terminated as the user terminal senses that a user has checked the generated event, for example.

The interface unit 160 serves as an interface for external devices to be connected with the user terminal 100. For example, the interface unit 160 can receive data transmitted from an external device, receive power to transfer to elements and components within the user terminal 100, or transmit internal data of the user terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the user terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the user terminal 100 is connected with an external cradle, the interface unit 160 can serve as a passage to allow power from the cradle to be supplied to the user terminal 100 or may serve as a passage to allow various command signals input by the user from the cradle to be transferred to the user terminal there through. Various command signals or power input from the cradle may operate as signals for recognizing that the user terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The user terminal 100 may also be operated in relation to a network storage device that performs the storage function of the memory 170 over a network, such as the Internet.

The controller 180 may typically control the general operations of the user terminal 100. For example, the controller 180 may set or release a lock state for restricting a user from inputting a control command with respect to applications when a status of the user terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the user terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A function related to artificial intelligence according to the present disclosure may be performed through a controller and a memory. The controller may include one or more processors. In this case, one or more processors may be a general-purpose processor such as a CPU, an AP, or a digital signal processor (DSP), a graphics-only processor such as a GPU and a vision processing unit (VPU), or an artificial intelligence-only processor such as an NPU. One or more processors may perform control to process input data according to a predefined operation rule or artificial intelligence model stored in the memory. Alternatively, when one or more processors are AI-only processors, the AI-only processor may be designed with a hardware structure specialized for processing a specific AI model.

The predefined operation rule or the artificial intelligence model may be created through learning. Here, creation through learning means that a predefined operation rule or an artificial intelligence model configured to perform a desired characteristic (or purpose) is created by learning a basic artificial intelligence model using a large number of learning data by a learning algorithm. Such learning may be performed in a device itself on which artificial intelligence according to the present disclosure is performed, or may be performed through a separate server and/or system. Examples of the learning algorithm include, but are not limited to, supervised learning, unsupervised learning, semi-supervised learning, or reinforcement learning.

The artificial intelligence model may include a plurality of neural network layers. Each of the plurality of neural network layers may have a multiple weight values and may perform neural network computation through a computation result of a previous layer and computation between the multiple weight values. The multiple values of the plurality of neural network layers may be optimized according to the learning result of the artificial intelligence model. For example, the multiple weight values may be updated to reduce or minimize a loss value or a cost value obtained from the artificial intelligence model during a learning process. An artificial neural network may include a deep neural network (DNN), and for example, may be a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network), but is not limited to the above-described example.

Figure 2:
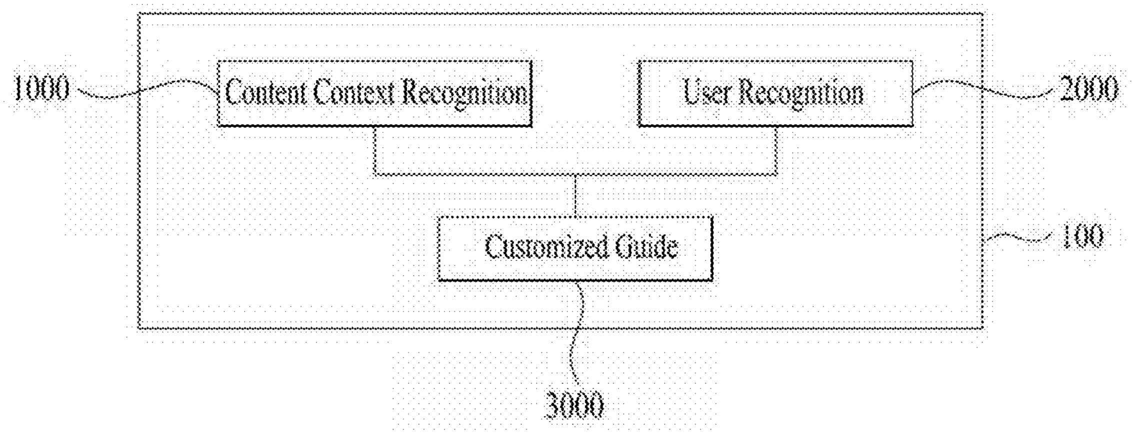
FIG. 2 is a schematic block diagram of the user terminal of FIG. 1 in terms of hardware.

Thus far, a user terminal related to the present disclosure has been described in terms of hardware. Hereinafter, with reference to FIG. 2, the user terminal of FIG. 1 will be described in terms of software that is capable of operating according to an aspect of the present disclosure.

The user terminal 100 may include a content context recognition module 1000, a user recognition module 2000, and the customized guide module 3000.

The content context recognition module 1000 may analyze content (hereinafter referred to as "exercise content") related to exercise and/or training through artificial intelligence to recognize context of the content. The content may be a streaming type content that is received by the user terminal 100 in real time via communication or may be stored in the memory 170.

The content context may mean information about a character included in the content and the content.

For example, in the case of yoga exercise content, the content context may include information about at least one of (but not limited to) i) a type of exercise of the content (i.e., yoga), ii) a character of the content (e.g., a trainer), iii) a movement posture of the character, or iv) a type and/or configuration of yoga movements included in the content.

The content context recognition module 1000 may sort information on the recognized context by content and may store the sorted information in the memory 170. The content context may be stored in the form of metadata for each content.

The user recognition module 2000 may recognize a user of the user terminal 100 through the camera 121. A camera used to recognize the user may be, but is not limited to, a depth camera and/or a time of flight (TOF) camera for three-dimensionally sensing a subject. The camera may also be a 2D camera.

Recognition of the user may include measurement of the body characteristics of the user and sensing of a motion of the user through artificial intelligence as well as recognition presence or absence of the user within an imaging angle of view of the camera 121. The body characteristics may include not only a body type (e.g., obesity of a lower body or obesity of an upper body) but also a location, circumference, and/or length of various parts of the body. Recognition of the body characteristics of the user may be performed prior to reproduction of the exercise content or may be performed during reproduction of the exercise content.

The sensed motion of the user may be sensed as a gesture input of the user to the user terminal 100 or may be sensed to recognize whether the user accurately follows an exercise motion proposed by the customized guide module 3000 to be described below, that is, to recognize training achievement of the user.

Recognition of the user may include recognition of a space (or a surrounding environment) in which the user is located.

The customized guide module 3000 may compare the recognized user with the context of the content reproduced in the user terminal 100 and may provide a guide to help the user exercise according to the content. The guide will be described again later.

In addition, the customized guide module 3000 may compare the recognized user with the context of the exercise content reproduced in the user terminal 100 and may adjust a speed of content reproduction when the user does not follow the content properly or follows the content too easily. For example, when the user does not follow the content properly, the customized guide module 3000 may slow down or pause reproduction of the content according to an exercise speed of the user.

The customized guide module 3000 may also recommend reproduction of content suitable for the user based on the body characteristics of the recognized user. When the content is recommended, a space of the recognized user may be further considered. This is because, depending on a type of exercise, a required minimum space may be different.

The customized guide module 3000 may compare the recognize user with context of the content reproduced in the user terminal 100, and when a speed of content reproduction is adjusted but the user does not follow the content properly or follows the content too easily, the content may be reproduced or other exercise content suitable for the user may be proposed except for a motion that is not capable of being followed properly by the user or being easily followed by the user among motions of exercise of the content.

Figure 3:
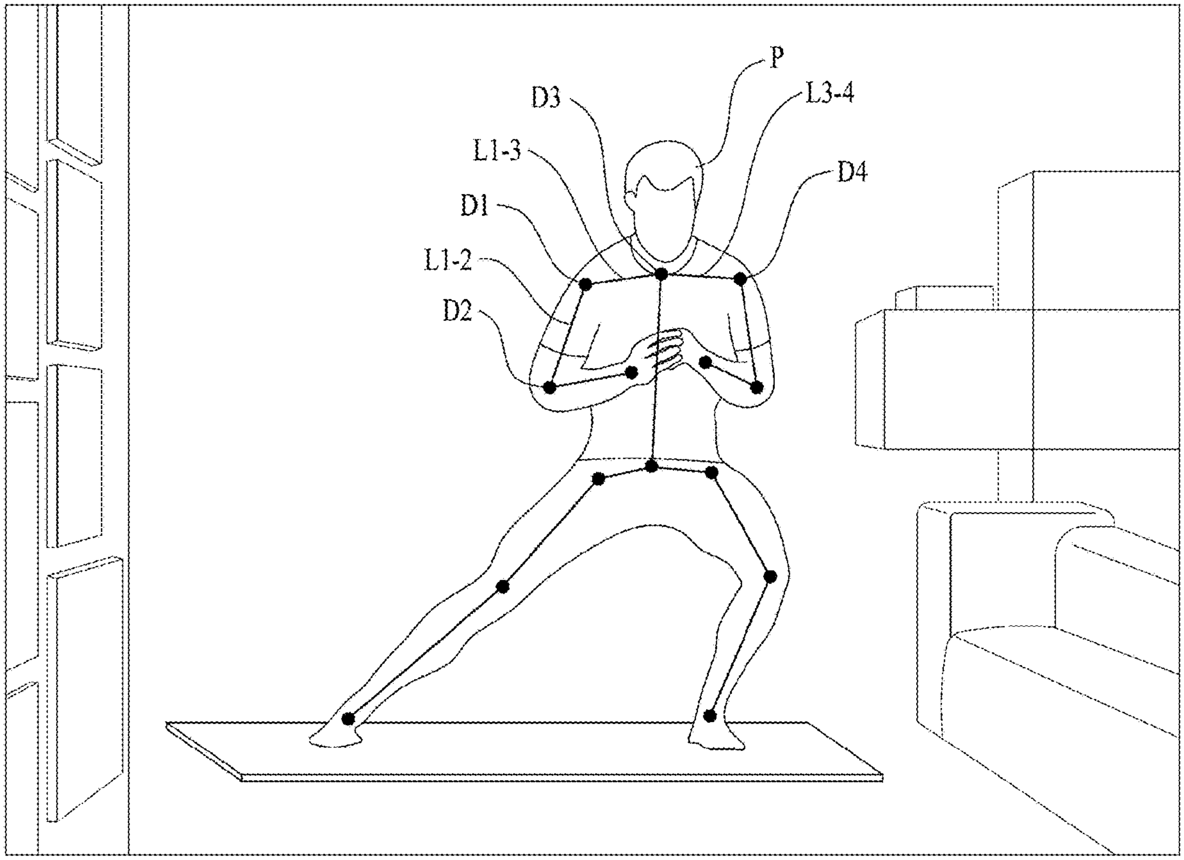
FIGS. 3 to 5 are diagrams showing an example of recognition of content context of exercise content according to an aspect of the present disclosure.
Figure 4:
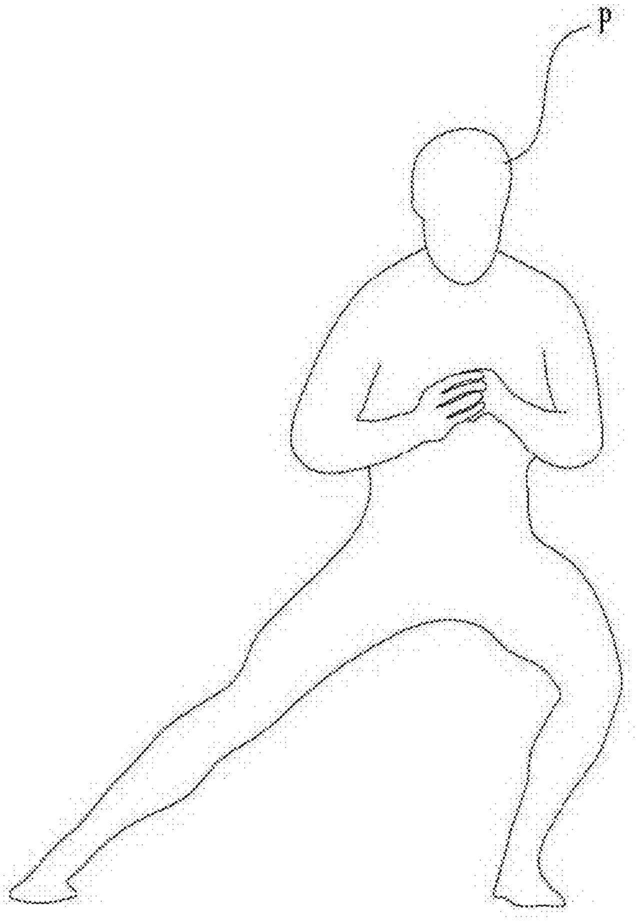
Figure 5:
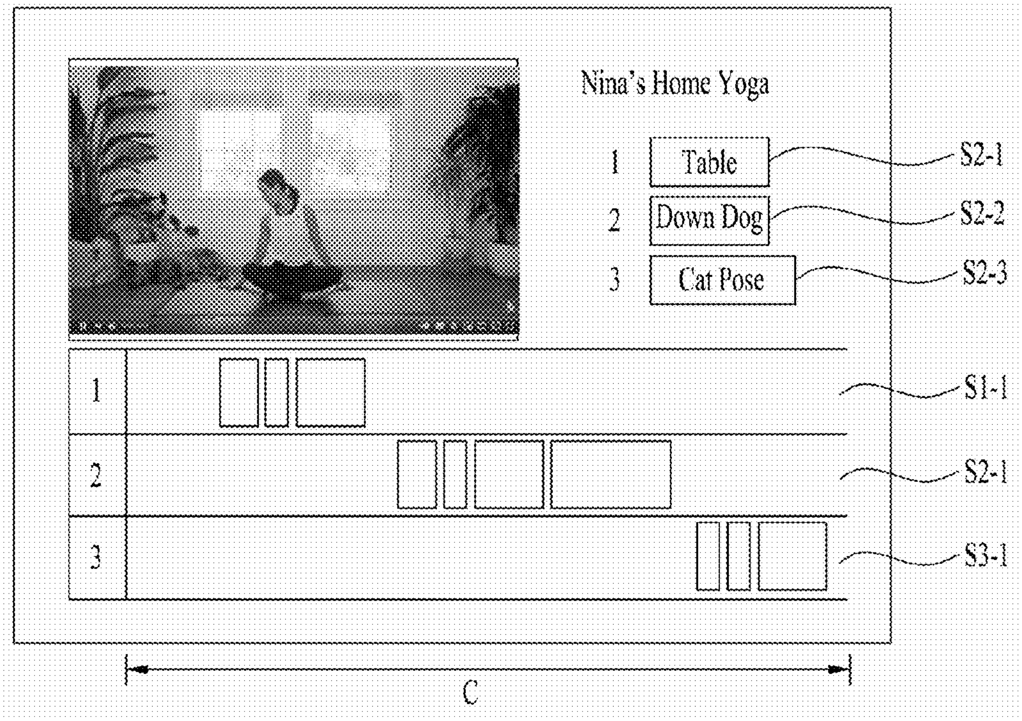

Hereinafter, with reference to FIGS. 3 to 5, recognition of content context of the above-described exercise content will be described in more detail. FIGS. 3 to 5 are diagrams showing an example of recognition of content context of exercise content according to an aspect of the present disclosure.

First, FIGS. 3 and 4 will be described.

The content context recognition module 1000 may recognize a trainer that is one of the characters appearing in the exercise content, may analyze a motion of the recognized trainer, may recognize an exercise type of the exercise content, and/or may recognize a motion posture of the recognized trainer.

As shown in FIG. 3, when the motion posture is recognized, the content context recognition module 1000 may recognize connection distances L1-2, L1-3, and L3-4 between joint parts D1, D2, and D3 of the trainer while recognizing the joint parts D1, D2, and D3 of the trainer, may recognize an angle between two or more connection distances at each joint part, and may recognize a change in the position of each joint part and a change in the angle between two or more connection distances as reproduction of the content proceeds.

As shown in FIG. 4, when the motion posture is recognized, the content context recognition module 1000 may extract only an appearance of the trainer within an image of the content (i.e., a surrounding background and a trainer are separated from the image), and may identify and recognize an outline P (or silhouette) of the trainer from the extracted appearance of the trainer. The content context recognition module 1000 may recognize a change in the outline of the trainer as reproduction of the content proceeds.

The content context recognition module 1000 may define a posture of exercise operated by the trainer based on the recognized body and movement information of the trainer. The defined motion posture may also be referred to as a "reference posture". That is, the content context recognition module 1000 may obtain information about the reference posture from a change in the outline of the trainer.

The content context recognition module 1000 may define the reference posture by analyzing the exercise content in advance before the exercise content is reproduced for the user or may analyze the exercise content and may also define the reference posture while the exercise content is reproduced for the user.

Hereinafter, FIG. 5 will be described below.

The content context recognition module 1000 may analyze the reference posture of the trainer over the entire running time (C) of the content and may divide an exercise program provided by the content into a plurality of exercise steps. That is, the content context recognition module 1000 may recognize a point at which the reference posture changes rapidly while the exercise program is executed and may divide before and after the recognized point into different exercise steps. The content context recognition module 1000 may classify the exercise program into a plurality of exercise steps with further reference to audio information of the content (e.g., exercise explanation voice of the trainer or relief voice such as counting).

FIG. 5 illustrates an example in which the exercise program is divided into a first operation S1-1, a second operation S2-1, and a third operation S3-1.

Then, the content context recognition module 1000 may identify and analyze a type of a motion (or a posture) corresponding to each operation among the plurality of operations, and may tag a motion name corresponding to each motion.

FIG. 5 illustrates an example in which the first operation S1-1 is tagged as a "Table" motion S1-2, the second operation S2-1 is tagged as a "down dog" motion S2-2, and the third operation S3-1 is tagged as a "Cast pose" motion S3-3.

Figure 6:
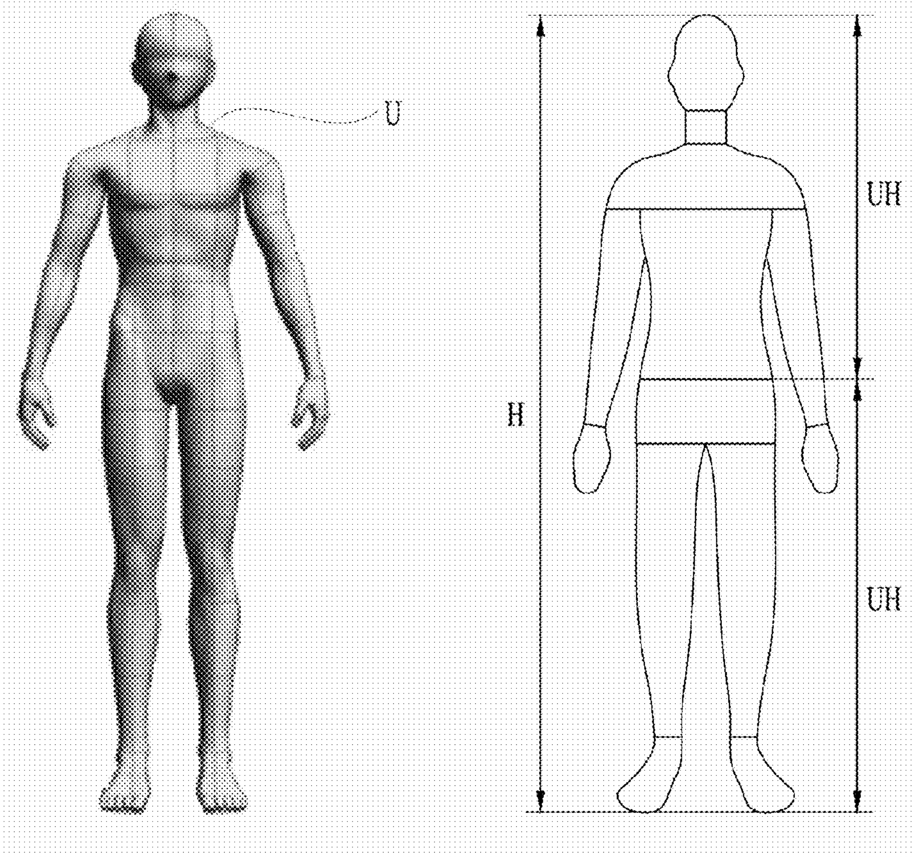
FIGS. 6 to 8 show an example of user recognition according to an aspect of the present disclosure.
Figure 7:
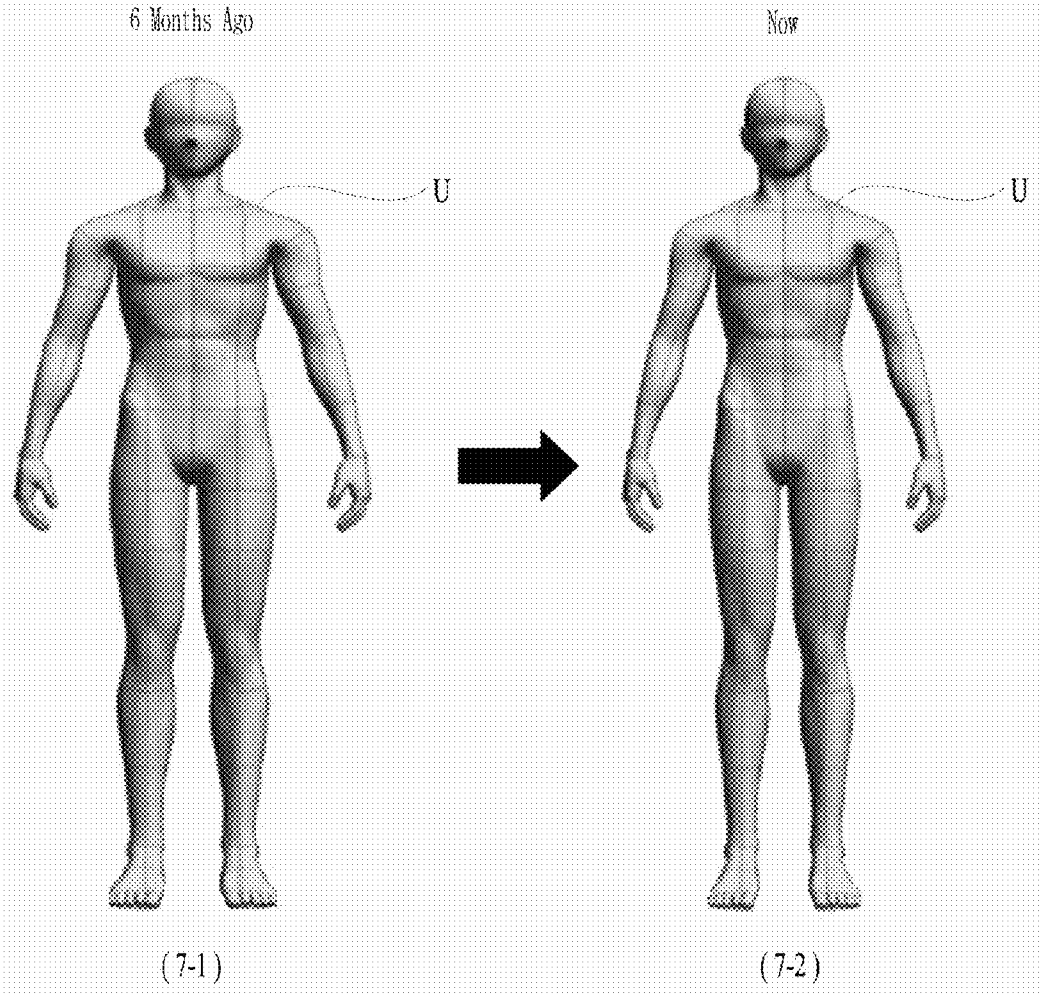
Figure 8:
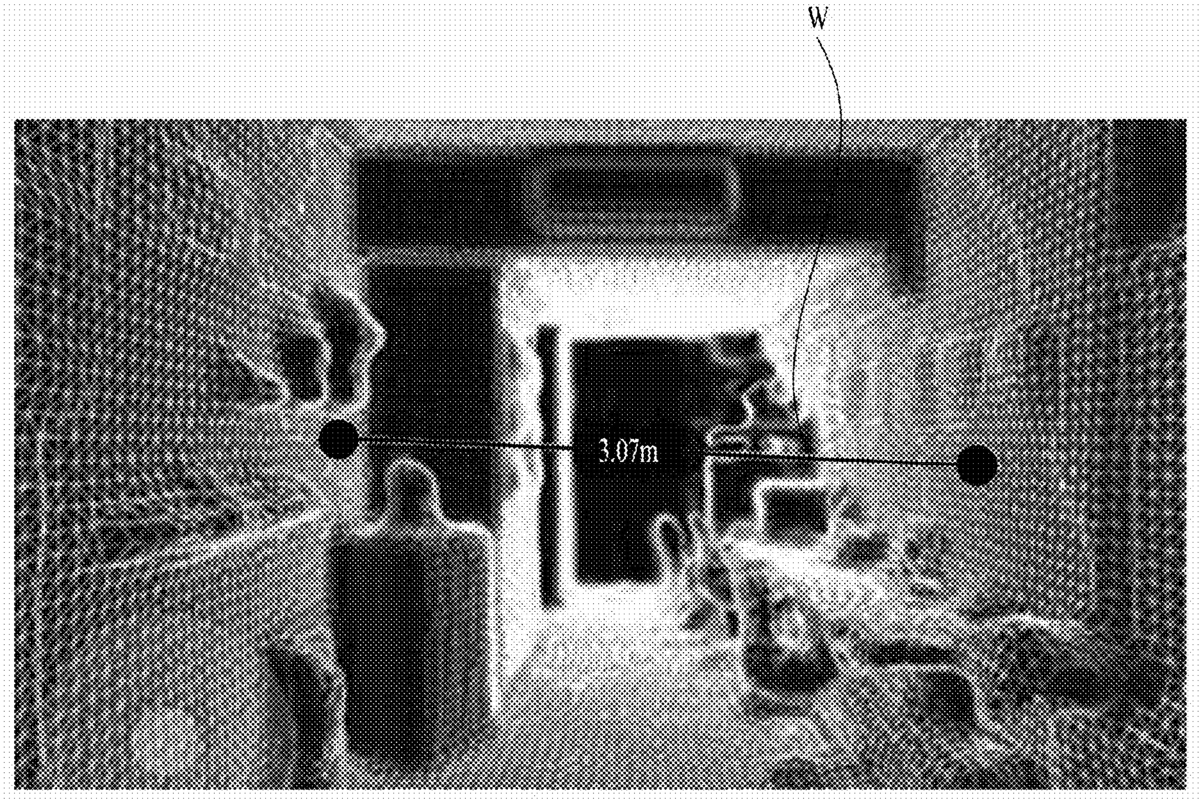

Hereinafter, the above-described user recognition will be described in more detail with reference to FIGS. 6 to 8. FIGS. 6 to 8 show an example of user recognition according to an aspect of the present disclosure.

First, FIGS. 6 and 7 will be described.

As shown in (6-1) of FIG. 6, the user recognition module 2000 may recognize a user U through the camera 121. The user recognition module 2000 may recognize the user U through the camera 121 and may capture an image of the user U. The captured image may be stored only in a volatile memory or may be stored in a non-volatile memory.

While the user terminal 100 reproduces the exercise content, the user recognition module 2000 may activate the camera 121 and may recognize the user U within a field of view of the activated camera 121. The camera 121 may be automatically activated without a separate user command when the exercise content is reproduced.

Before the user terminal 100 reproduces the exercise content, the user recognition module 2000 may activate the camera 121 through a separate pre-procedure and may recognize the user U within the field of view of the activated camera 121. That is, the user recognition module 2000 may activate the camera by executing a separate menu, application, or program for user recognition that is not related to reproduction of the exercise content, and may recognize the user U within the field of view of the activated camera 121.

As shown in (6-2) of FIG. 6, the user recognition module 2000 may recognize the body characteristics of the user U from the image of the recognized user U. The recognized body characteristics of the user U may include at least one of a height H, an upper body height UH, an upper body circumference, a lower body height LH, a lower body circumference, an arm length, an arm circumference, a joint position, or a connection distance between joints. Based thereon, the user recognition module 2000 may also recognize a body type of the user (e.g., obesity of a lower body or obesity of an upper body).

The user recognition module 2000 may sense movement of the user U through the camera 121. In this case, the user recognition module 2000 may more accurately sense the movement of the user U by recognizing a change in the position of each joint part and a change in the angle between two or more connection distances using information on the body characteristics.

The user recognition module 2000 may cumulatively store the body characteristics of the user in the memory 170. Accordingly, the user terminal 100 may visually display a change in the body characteristics of the user at constant intervals. In FIG. 7, the user terminal 100 may visually display the body characteristics of the user ((7-2) of FIG. 7) compared with the body characteristics of the user from six months ago ((7-1) of FIG. 7).

Hereinafter, FIG. 8 will be described.

The user recognition module 2000 may recognize not only the body characteristics of the user but also a space (or a surrounding environment) in which the user is located, through the camera 121.

The user recognition module 2000 may determine whether the space in which the user is currently located is indoors or outdoors, and the size (the area and height) of the space in which the user is capable of moving.

For example, the user recognition module 2000 may recognize an outer appearance of objects among images captured through the camera 121 and may recognize a space in which the user is capable of moving.

FIG. 8 illustrates the case in which the user recognition module 2000 may extract at least two walls constituting an interior from among the objects based on the outer appearance of the recognized objects and may calculate a width between the walls to recognize a space in which the user is capable of moving. Needless to say, the user recognition module 2000 may extract the floor and ceiling constituting an interior and may further calculate a distance between the floor and the ceiling to more accurately recognize the space in which the user is capable of moving.

Figure 9:
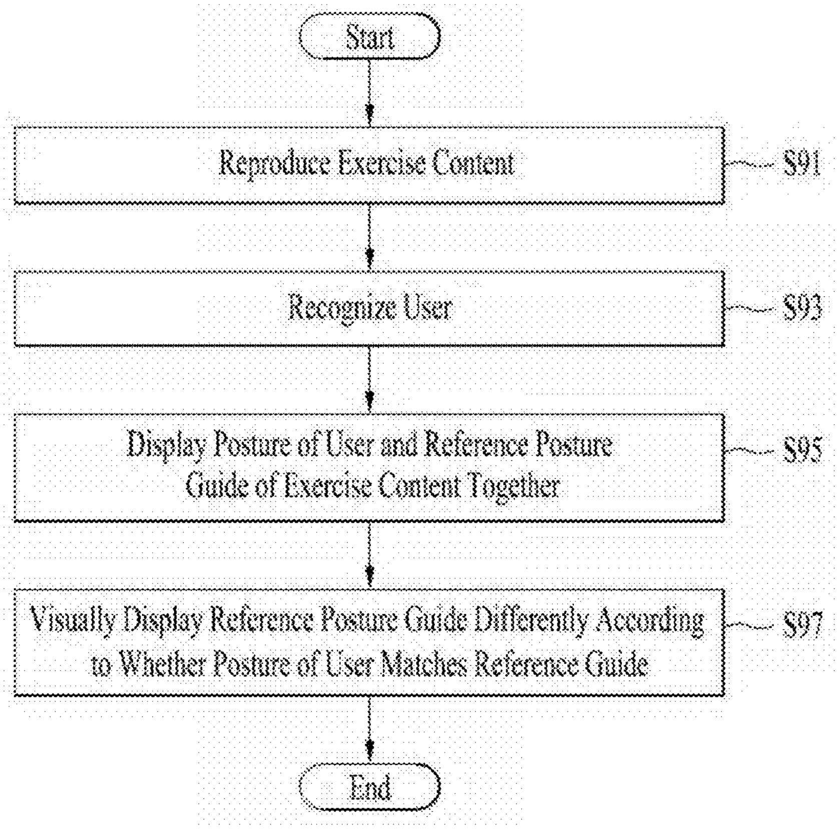
FIG. 9 is a flowchart of a customized guide according to an aspect of the present disclosure.
Figure 10:
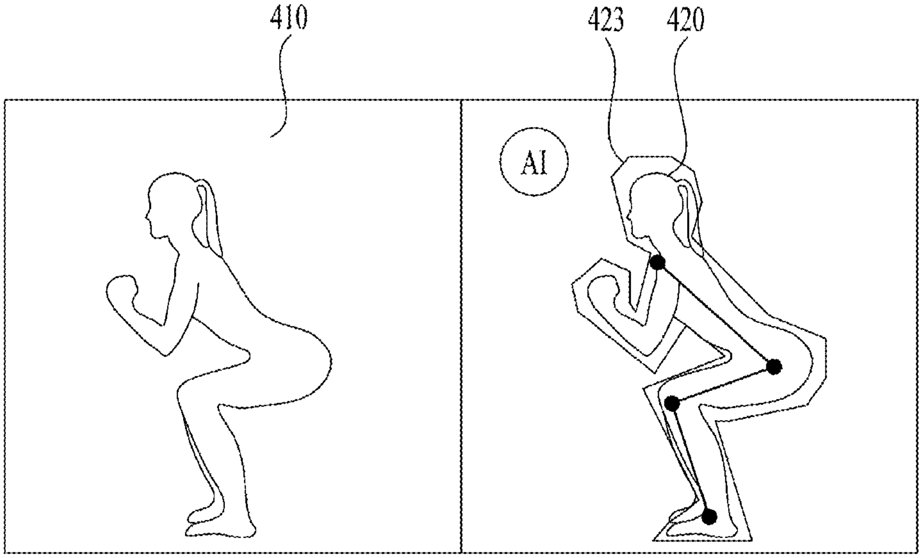
FIG. 10 is a diagram showing an image to be displayed on a user terminal according to the customized guide of FIG. 9.

Hereinafter, with reference to FIGS. 9 and 10, the above-described customized guide will be described in more detail. FIG. 9 is a flowchart of a customized guide according to an aspect of the present disclosure. FIG. 10 is a diagram showing an image to be displayed on a user terminal according to the customized guide of FIG. 9.

The user terminal 100 may reproduce and display the exercise content 410 (S91).

The reproduced exercise content 410 may be content selected by the user or may be content recommended by the customized guide module 3000 based on the recognition result of the user.

Then, the user terminal 100 may recognize an exercise posture of the user performing an exercise according to the exercise content through the user recognition module 2000 in real time while the exercise content is reproduced (S93).

Then, the user terminal 100 may display the recognized exercise posture 420 of the user in real time (S95). In this case, the user terminal 100 may display a graphic (hereinafter referred to as the "reference posture guide") 423 for guiding a reference posture suitable for the exercise posture 420 of the user through the customized guide module 3000 along with the recognized exercise posture of the user (S97). The reference posture guide may be generated from information about the reference posture and may be displayed to be overlaid on the exercise posture 420 of the user.

The reference posture may be predefined before the exercise content is reproduced for the user by the content context recognition module 1000 or may be defined while the exercise content is reproduced for the user.

Thus, the user may visually check how much an exercise posture thereof conforms to the reference posture while seeing the exercise posture 420 of the user and the reference posture guide 423, and simultaneously, may perform an exercise while correcting the posture in such a way that the exercise posture of the user conforms to the reference posture.

When the user's appearance photographed by the camera 121 is small because the user exercises away from the user terminal 100, the user terminal 100 may control zoom-in of the camera 121 or may enlarge the exercise posture of the user to display the entire exercise posture of the user within a range displayed on one screen in order to adjust the size of the user's appearance photographed by the camera 121, may adjust the size of the reference posture guide 423 to match the exercise posture of the user based on the user's appearance, the size of which is adjusted, and may display the reference posture guide 423 to be overlaid on the enlarged exercise posture of the user.

Alternatively, when only a part of the user's appearance photographed by the camera 121 is photographed because the user exercises in proximity to the user terminal 100, the user terminal 100 may control zoom-out of the camera 121 to display the entire exercise posture of the user on one screen in order to adjust the size of the user's appearance, may adjust the size of the reference posture guide 423 to match the exercise posture of the user based on the user's appearance, the size of which is adjusted, and may display the reference posture guide 423 to be overlaid on the enlarged exercise posture of the user.

Since the body characteristics of the trainer appearing in the exercise content and the body characteristics of the user are different, the reference posture guide generated based on the body characteristics of the trainer may not be suitable for the user.

Accordingly, the customized guide module 3000 may correct the shape of the reference posture guide 423 to match the body characteristics of the user. That is, the customized guide module 3000 may provide the reference posture guide 423 in a different form for users with different body characteristics even when the same exercise content is reproduced in the user terminal 100.

That is, not only the size of the reference posture guide 423 but also the shape of the reference posture guide 423 may be adjusted.

The user terminal 100 may visually display the reference posture guide 423 differently depending on whether the exercise posture of the user conforms to the reference posture (S97).

For example, the user terminal 100 may display the reference posture guide 423 to make at least one of the color or the shape of the reference posture guide 423 be different depending on whether the exercise posture of the user conforms to the reference posture.

Alternatively, when the exercise posture of the user conforms to the reference posture, the user terminal 100 may not display the reference posture guide 423, and when the exercise posture of the user does not conform to the reference posture, the user terminal 100 may display the reference posture guide 423.

Figure 11:
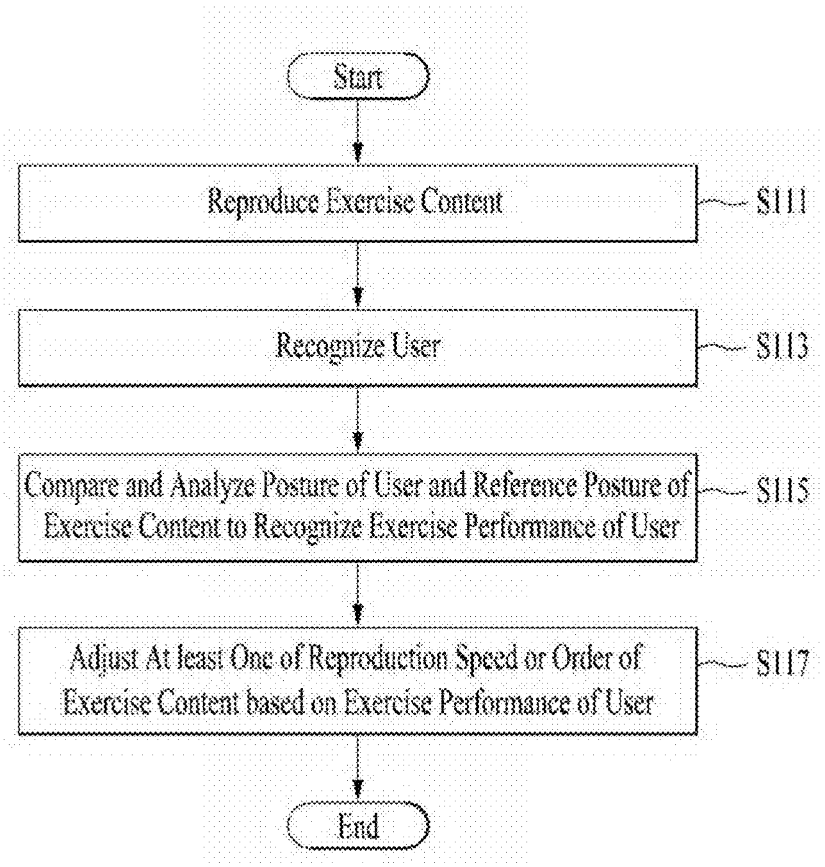
FIG. 11 is a flowchart of a customized guide according to an aspect of the present disclosure.

Hereinafter, with reference to FIG. 11, a customized guide of a style different from the style of FIGS. 9 and 10 will be described in more detail. FIG. 11 is a flowchart of a customized guide according to an aspect of the present disclosure. The customized guide of FIG. 11 may be independently performed from the customized guide of FIG. 9, but needless to say, the customized guides of FIGS. 9 and 11 may be performed together in that functions of the customized guides of FIGS. 9 and 11 are not different.

The user terminal 100 may reproduce and display the exercise content 410 (S111).

Then, the user terminal 100 may recognize an exercise posture of the user performing an exercise according to the exercise content through the user recognition module 2000 in real time while reproducing the exercise content (S113). Operations S111 and S113 are the same as the above-described operations S91 and S93, respectively, and thus a detailed description thereof will omitted.

Then, the user terminal 100 may compare and analyze the recognized exercise posture of the user with the reference posture of the exercise content through the customized guide module 3000 and may recognize exercise performance of the user (S115).

The reference posture may be predefined before the exercise content is reproduced for the user by the content context recognition module 1000 or may be defined while the exercise content is reproduced for the user.

The exercise performance may be determined, for example, according to whether the exercise posture of the user recognized in real time during reproduction of the exercise content and the real-time reference posture of the reproduced exercise content are synchronized with each other. When the synchronization does not match, this may mean that the exercise posture of the user is recognized later or faster than the reference posture.

When the exercise posture of the user is recognized later in time than the reference posture, this may mean that, since an exercise difficulty of the exercise content is high compared to the physical strength of the user, the user is not capable of following the exercise (e.g., squat exercise) according to a reproduction speed of the exercise content When the exercise posture of the user is recognized faster in time than the reference posture, this may mean that, since an exercise difficulty of the exercise content is low compared to the physical strength of the user, the user performs the exercise faster than the reproduction speed of the exercise content.

The exercise performance may be determined according to a degree by which the real-time exercise posture of the user corresponds to the real-time reference posture of the exercise content, that is, accuracy of the real-time exercise posture based on the real-time reference posture even if the real-time exercise posture of the user and the real-time reference posture of the exercise content are synchronized with each other.

When the real-time exercise posture of the user corresponds to the real-time reference posture of the exercise content, this means that, since the exercise difficulty of the exercise content is high compared to the physical strength of the user, the user is not capable of accurately following the exercise of the exercise content.

Then, the user terminal 100 may adjust at least one of a reproduction speed or an order of the exercise content based on the exercise performance of the user through the customized guide module 3000 (S117).

For example, when the exercise posture of the user is recognized later in time than the reference posture, the customized guide module 3000 may slow down or pause reproduction of the exercise content until the real-time exercise posture of the user and the real-time reference posture of the exercise content are synchronized with each other.

When the exercise posture of the user is recognized faster in time than the reference posture, the customized guide module 3000 may increase the reproduction speed of the exercise content to synchronize the real-time exercise posture of the user and the real-time reference posture of the exercise content with each other.

When the real-time exercise posture of the user does not correspond to the real-time reference posture of the exercise content (that is, when the accuracy of the real-time exercise posture based on the real-time reference posture is less than a predetermined level), the customized guide module 3000 may slow down the exercise content to allow the user to properly follow the real-time reference posture of the exercise content.

When the real-time exercise posture of the user corresponds to the real-time reference posture of the exercise content (that is, when the accuracy of the real-time exercise posture based on the real-time reference posture is equal to or greater than a predetermined level), the customized guide module 3000 may increase the reproduction speed of the exercise content.

Even if the reproduction speed of the exercise content is adjusted, the customized guide module 3000 may determine that the exercise performance is not sufficient.

In this case, the customized guide module 3000 may skip the currently played exercise phase from the exercise content and may reproduce another exercise phase that matches the exercise performance of the user. In this case, the customized guide module 3000 may automatically reproduce the other exercise phase or may display a guide asking the user whether to reproduce the other exercise phase and may then receive additional input from the user to reproduce the other exercise.

Alternatively, other exercise content that satisfies the exercise performance of the user of the customized guide module 3000 may also be recommended to the user.

Figure 12:
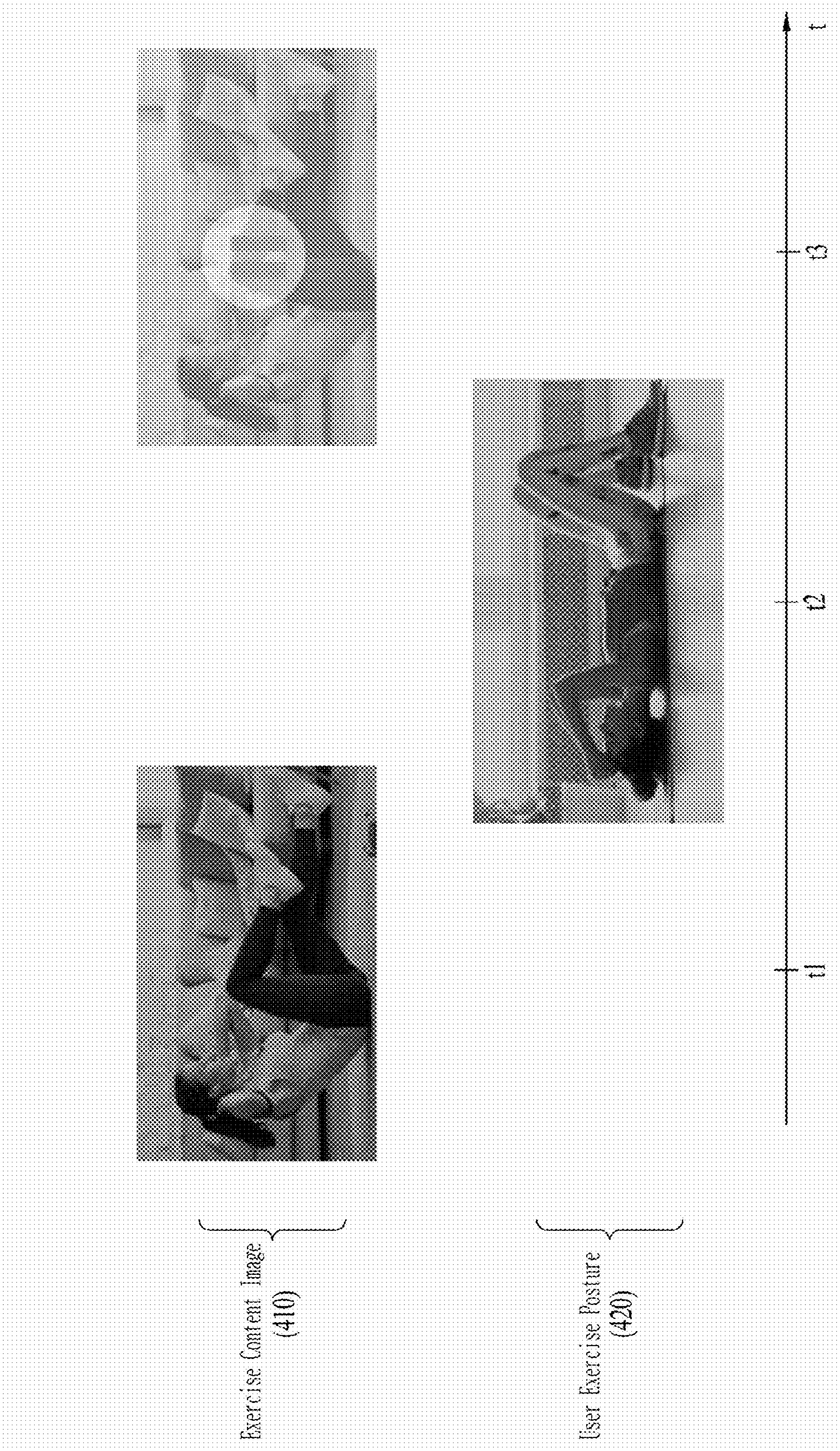
FIG. 12 is a diagram showing an example of the customized guide of FIG. 11.

Hereinafter, with reference to FIG. 12, an example of the customized guide of FIG. 11 will be described. FIG. 12 is a diagram showing an example of the customized guide of FIG. 11.

A reproduced image 410 of the exercise content may be displayed at a first time t1 as the user terminal 100 reproduces the exercise content.

While reproducing the exercise content, the user terminal 100 may recognize in real time the exercise posture 420 of the user who exercises according to the exercise content through the user recognition module 2000.

The user terminal 100 may detect through the user recognition module 2000 that the user is not capable of following the exercise according to the reproduction speed of the exercise content at a second time t2.

Then, the user terminal 100 may slow down or pause reproduction of the exercise content at a third time t3 until the real-time exercise posture of the user and the real-time reference posture of the exercise content are synchronized with each other. FIG. 12 illustrates the case in which reproduction of the exercise content is paused at the third time t3.

Although FIG. 12 illustrates the case in which the third time t3 is completely distinct from the second time t2, the user may feel as if the third time t3 is quite close to the second time t2 and thus the third time t3 and the second time t2 are in fact the same in the user's sense.

Figure 13:
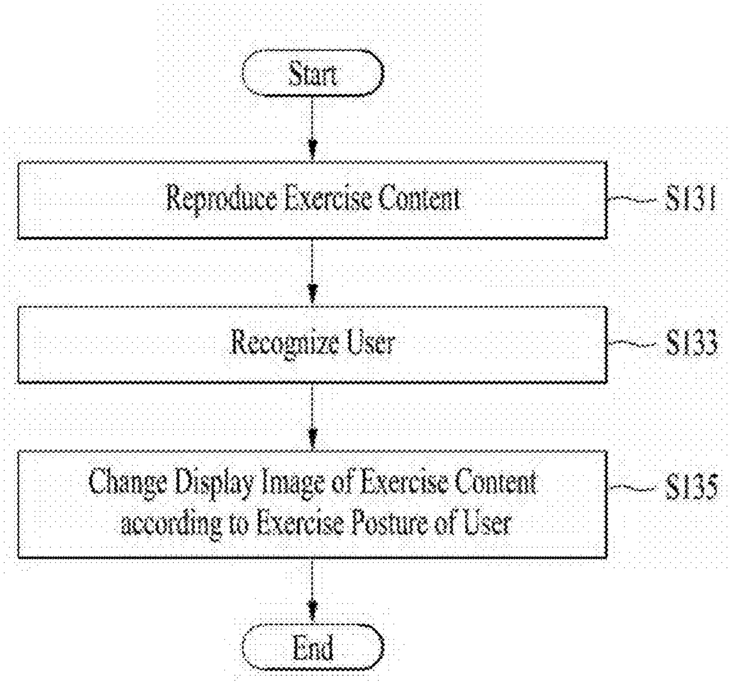
FIG. 13 is a flowchart of a customized guide according to an aspect of the present disclosure.
Figure 14:
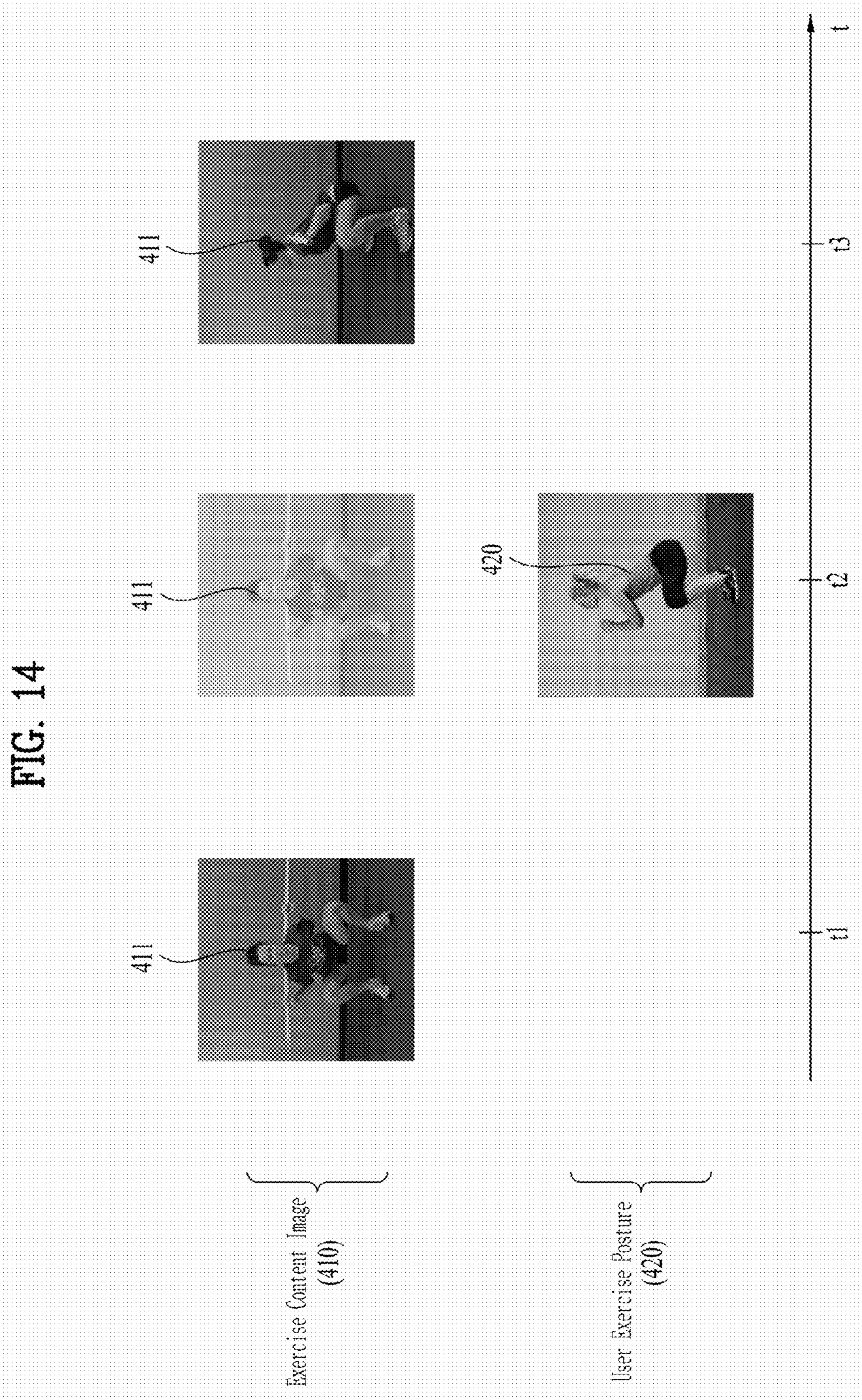
FIGS. 14 to 16 are diagrams showing an example of the customized guide of FIG. 13.
Figure 15:
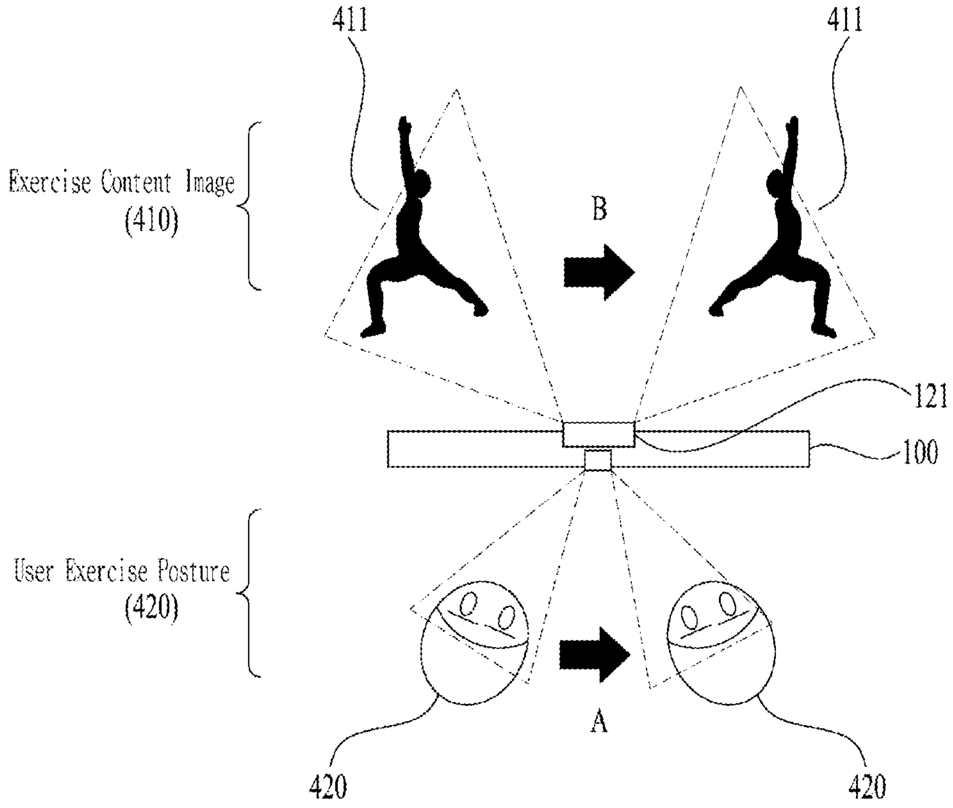
Figure 16:
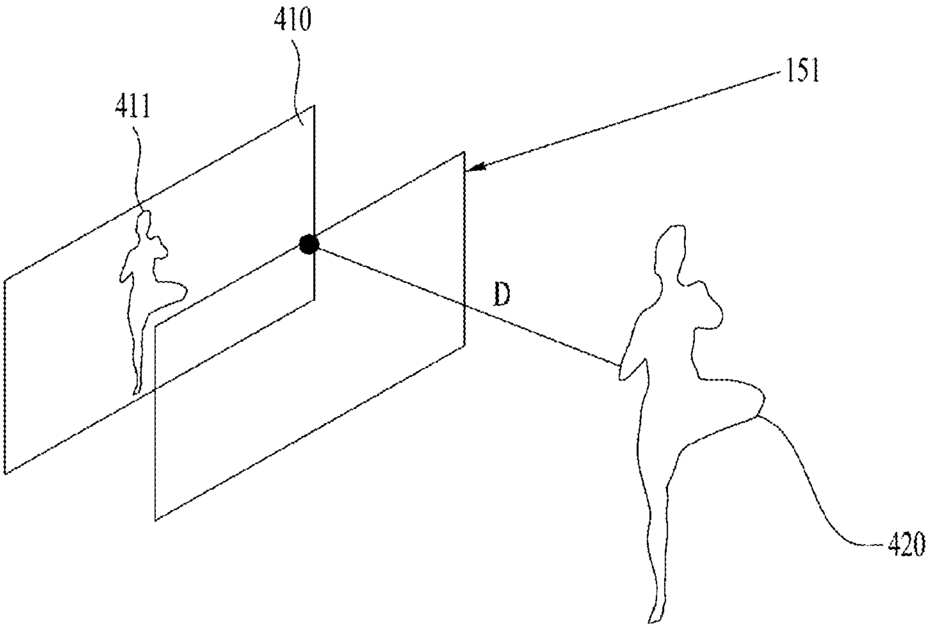

Hereinafter, with reference to FIGS. 13 to 16, conversion of a display image of exercise content according to a direction of the recognized user when the user terminal 100 reproduces the exercise content will be described. FIG. 13 is a flowchart of a customized guide according to an aspect of the present disclosure. FIGS. 14 to 16 are diagrams showing an example of the customized guide of FIG. 13. The customized guide of FIG. 13 may be independently performed from the customized guides of FIGS. 9 and 11, but needless to say, the customized guide of FIG. 13 may be performed with at least one of the customized guide of FIG. 9 or 11 in that functions of the customized guides of FIGS. 9, 11, and 13 are not different.

The user terminal 100 may reproduce and display the exercise content 410 (S131).

Then, the user terminal 100 may recognize an exercise posture of the user performing an exercise according to the exercise content through the user recognition module 2000 in real time while reproducing the exercise content (S133). Operations S131 and S133 are the same as the above-described operations S91 and S93, respectively, and thus a detailed description thereof will omitted.

Then, the user terminal 100 may convert an image of the exercise content that is reproduced and displayed by the user terminal 100 according to the exercise posture of the recognized user (S135). That is, the image of the exercise content may be converted to conform to the exercise posture of the recognized user, which will be described in more detail with reference to an example of FIG. 14.

As the user terminal 100 reproduces the exercise content, the reproduced image 410 of the exercise content may be displayed at the first time t1. The front of a trainer 411 who is a character in the reproduced image 410 of the exercise content may be seen at the first time t1.

While the image 410 of the exercise content is reproduced to allow the front of the trainer 411 to be seen, the user terminal 100 may recognize that a direction of the exercise posture of the user is a lateral side at the second time t2.

Then, the user terminal 100 may automatically convert the image of the exercise content and may continuously reproduce the image to allow a side of the trainer 411 to be seen to match a direction of the exercise posture of the user at the third time t3. Here, the term “automatically” may mean that the user does not need to input a separate touch and/or user voice command for converting the image of the exercise content.

In order to convert the image of the exercise content, the exercise content may be prepared to allow any direction of at least two directions including the front and the side of the trainer 411 to be seen over the entire running time of the exercise content. In this case, the user terminal 100 may initially reproduce the exercise content to allow the front of the trainer 411 to be seen, and may then reproduce the exercise content to allow the side of the trainer 411 to be seen according to a direction of the exercise posture of the recognized user.

Alternatively, the exercise content may be prepared and reproduced to allow only one direction (e.g., the front) of the trainer 411 in the exercise content to be seen. In this case, the user terminal 100 may initially reproduce the exercise content to allow the front of the trainer 411 to be seen, may analyze the image of the exercise content using artificial intelligence according to the direction of the exercise posture of the recognized user, and may then convert and reproduce the image of the exercise content to allow the side of the trainer 411 to be seen.

Although FIG. 14 illustrates the case in which the third time t3 is completely distinct from the second time t2, the user may feel as if the third time t3 is quite close to the second time t2 and thus the third time t3 and the second time t2 are in fact the same in the user’s sense.

Conversion of the image of the exercise content to conform to the exercise posture of the recognized user will be described with reference to another example of FIG. 15.

While reproducing the exercise content, the user terminal 100 may recognize that the exercise posture of the user is changed through the camera 121. Although FIG. 15 illustrates the case in which the user’s head moves in direction A, but the present disclosure is not limited thereto.

Then, the user terminal 100 may determine whether the changed exercise posture of the user matches a preset user gesture (e.g., tilting the head). The user gesture may be preset when the user terminal 100 is shipped from the factory or may be preset through a setting menu of the user terminal 100 before the exercise content is reproduced.

When determining that the changed exercise posture of the user matches the preset user gesture, the user terminal 100 may convert the image of the exercise content and may continuously reproduce the image to correspond to the preset user gesture.

FIG. 15 illustrates the case in which the trainer 411 that is a character in the exercise content is moved after inversion in B direction corresponding to the direction A to convert the image of the exercise content. As described above, conversion of the image of the exercise content may be prepared or may be performed through artificial intelligence.

An embodiment of the present disclosure is not limited thereto. For example, according to the preset user gesture, the image of the exercise content may be converted to enlarge or reduce the entire reference posture of the trainer 411 within a range displayed on one screen.

Conversion of the image of the exercise content to conform to the exercise posture of the recognized user will be described with reference to another example of FIG. 16.

While reproducing the exercise content 410, the user terminal 100 may detect a separation distance D between the user 420 and a display 151 through the camera 121.

The user terminal 100 may enlarge the image 410 of the exercise content to enlarge or reduce the reference posture of the trainer 411, which is a character of the exercise content 410, within a range displayed on one screen based on the separation distance D. The image 410 of the exercise content may be enlarged in proportion to the separation distance D. The reference posture of the trainer needs to be seen well on the display 151 even if the user 420 is spaced a considerable distance from the user terminal 100. When enlarging the image 410 of the exercise content, the user terminal 100 may determine an enlargement degree by further considering at least one of the resolution of the exercise content 410, the resolution of the display 151, or the size of the display 151.

An effect of a method of providing customized training content and a user terminal for implementing the same according to the present disclosure will be described below.

According to at least one of various aspects of the present disclosure, interest in exercise may be further increased by providing training content in consideration of the physical ability and characteristics of a user and simultaneously allowing the user to easily know whether the user is exercising with a correct posture and method to continuously exercise at a pace suitable for a level of the user.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A user terminal comprising:

a display;

a camera; and a controller configured to:

acquire information on a reference posture of a trainer appearing in an exercise content through artificial intelligence, recognize an exercise posture of a user photographed through the camera through artificial intelligence while the exercise content is reproduced, adjust a reproduction speed of the exercise content based on the recognized exercise posture of the user, display the exercise posture of the user on the display, generate a reference posture guide from the information on the reference posture, and display the reference posture guide to be overlaid on the exercise posture of the user, in response to only a part of the user's appearance being photographed by the camera, control the camera to zoom-out to display the exercise posture of the user entirely on the display, and adjust a size of the reference posture guide to match the exercise posture of the user such that the reference posture guide is overlaid on the entirely-displayed exercise posture of the user.

2. The user terminal of claim 1, wherein the controller is configured to acquire the information on the reference posture while the exercise content is reproduced.

3. The user terminal of claim 1, wherein the controller is configured to:

compare the reference posture and the exercise posture of the user to recognize exercise performance of the user, and adjust the reproduction speed of the exercise content according to the recognized exercise performance.

4. The user terminal of claim 3, wherein the exercise performance is determined according to synchronization between a real-time exercise posture of the user and a real-time reference posture while the exercise content is reproduced.

5. The user terminal of claim 4, wherein, in response to the real-time exercise posture of the user being later than the real-time reference posture, the controller is configured to pause reproduction of the exercise content or lower the reproduction speed of the exercise content until the real-time reference posture and the real-time exercise posture of the user are synchronized with each other.

6. The user terminal of claim 4, wherein, in response to the real-time exercise posture of the user being faster than the real-time reference posture, the controller is configured to increase the reproduction speed of the exercise content until the real-time reference posture and the real-time exercise posture of the user are synchronized with each other.

7. The user terminal of claim 3, wherein the exercise performance is determined according to accuracy of a real-time exercise posture of the user based on a real-time reference posture while the exercise content is reproduced.

8. The user terminal of claim 7, wherein, in response to the accuracy being equal to or less than a predetermined level, the controller is configured to lower the reproduction speed of the exercise content.

9. The user terminal of claim 1, wherein the controller is configured to correct a shape of the reference posture guide to match body characteristics of the user.

10. The user terminal of claim 1, wherein the controller is configured to compare the reference posture and the exercise posture of the user to recognize exercise performance of the user, and change a reproduction order of the exercise content according to the recognized exercise performance.

11. The user terminal of claim 1, wherein the controller is configured to change a display image of the reproduced exercise content according to the recognized exercise posture of the user.

12. The user terminal of claim 11, wherein the controller is configured to change a direction of the trainer of the reproduced exercise content to match a direction of the recognized exercise posture of the user.

13. The user terminal of claim 11, wherein, in response to a change in the recognized exercise posture of the user matching a preset gesture, the controller is configured to move the trainer in the exercise content or enlarge or reduce the trainer in the exercise content.

14. The user terminal of claim 11, wherein the controller is configured to enlarge or reduce the trainer in the exercise content according to a separation distance between the recognized user and the display.

15. A method of controlling a user terminal, comprising:

acquiring information on a reference posture of a trainer appearing in an exercise content through artificial intelligence;

recognizing an exercise posture of a user photographed through the camera through artificial intelligence while the exercise content is reproduced on a display;

adjusting a reproduction speed of the exercise content based on the recognized exercise posture of the user, displaying the exercise posture of the user on the display;

generating a reference posture guide from the information on the reference posture;

displaying the reference posture guide to be overlaid on the exercise posture of the user;

in response to only a part of the user's appearance being photographed by the camera, controlling the camera to zoom-out to display the exercise posture of the user entirely on the dis-play, and adjusting a size of the reference posture guide to match the exercise posture of the user such that the reference posture guide is overlaid on the entirely-displayed exercise posture of the user.

16. The method of claim 15, further comprising:

acquiring the information on the reference posture while the exercise content is reproduced.

17. The method of claim 15, further comprising:

comparing the reference posture and the exercise posture of the user to recognize exercise performance of the user; and adjusting the reproduction speed of the exercise content according to the recognized exercise performance.

18. The method of claim 15, further comprising:

comparing the reference posture and the exercise posture of the user to recognize exercise performance of the user; and changing a reproduction speed of the exercise content according to the recognized exercise performance.

* * * * *